United States Patent
Kinzie et al.

(10) Patent No.: US 8,231,344 B2
(45) Date of Patent: Jul. 31, 2012

(54) METHODS FOR CONTROLLING THE AMPLITUDE MODULATION OF NOISE GENERATED BY WIND TURBINES

(75) Inventors: Kevin Wayne Kinzie, Spartanburg, SC (US); Benoit Petitjean, Rheine (DE); Roger Drobietz, Rheine (DE); Thomas Joseph Fischetti, Simpsonville, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/176,144

(22) Filed: Jul. 5, 2011

(65) Prior Publication Data

US 2012/0027592 A1 Feb. 2, 2012

(51) Int. Cl.
*F03D 7/04* (2006.01)
(52) U.S. Cl. .............. 416/1; 416/35; 416/37; 416/41
(58) Field of Classification Search ............... 416/1, 35, 416/37, 41
See application file for complete search history.

(56) References Cited

U.S. PATENT DOCUMENTS

| 6,688,841 | B1 | 2/2004 | Wobben |
| 2009/0068018 | A1* | 3/2009 | Corten ................ 416/223 R |
| 2009/0311096 | A1 | 12/2009 | Herr et al. |
| 2009/0311097 | A1 | 12/2009 | Pierce et al. |
| 2010/0021296 | A1* | 1/2010 | Nielsen ...................... 416/1 |
| 2010/0074748 | A1* | 3/2010 | Godsk et al. ................ 416/1 |
| 2010/0098541 | A1 | 4/2010 | Benito et al. |

FOREIGN PATENT DOCUMENTS

| EP | 1 748 184 A2 | 1/2007 |
| EP | 2 000 665 A9 | 3/2009 |
| GB | 2 067 247 A * | 7/1981 |

* cited by examiner

*Primary Examiner* — Edward Look
*Assistant Examiner* — Sean J Younger
(74) *Attorney, Agent, or Firm* — Dority & Manning, P.A.

(57) ABSTRACT

In one aspect, a method for controlling the amplitude modulation of noise generated by a wind turbine is disclosed. The method may generally include determining an angle of attack of a rotor blade of a wind turbine and maintaining the angle of attack at a substantially constant value during rotation of the rotor blade in order to reduce the amplitude modulation of the noise generated by the wind turbine.

19 Claims, 5 Drawing Sheets

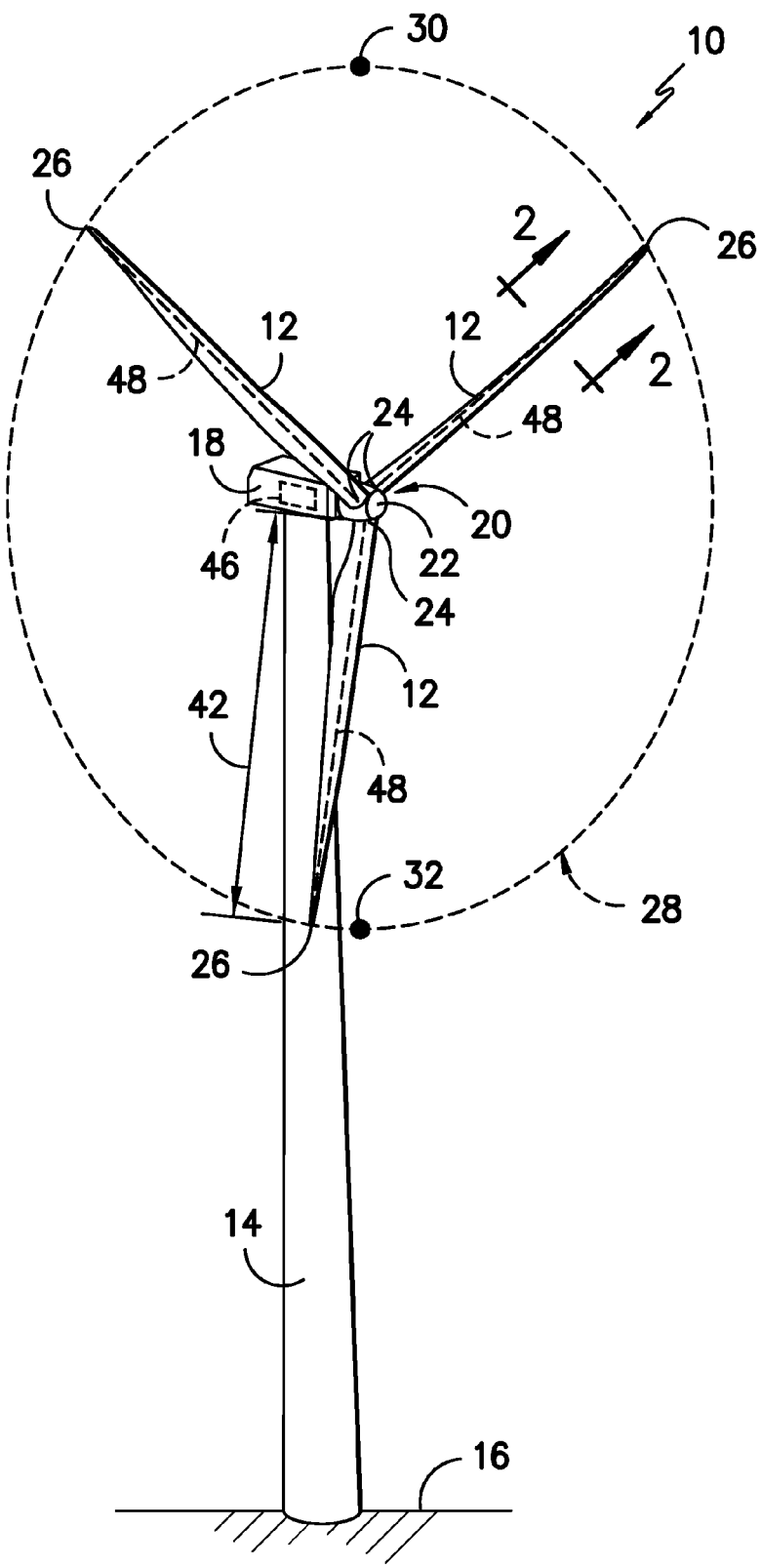
FIG. -1-

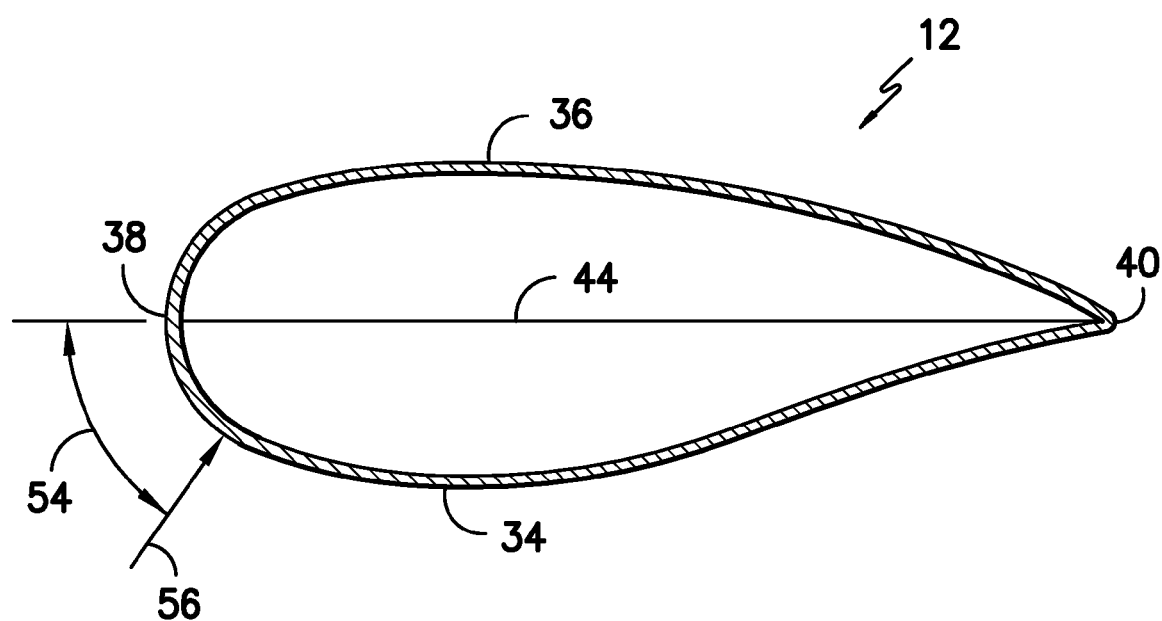
FIG. -2-

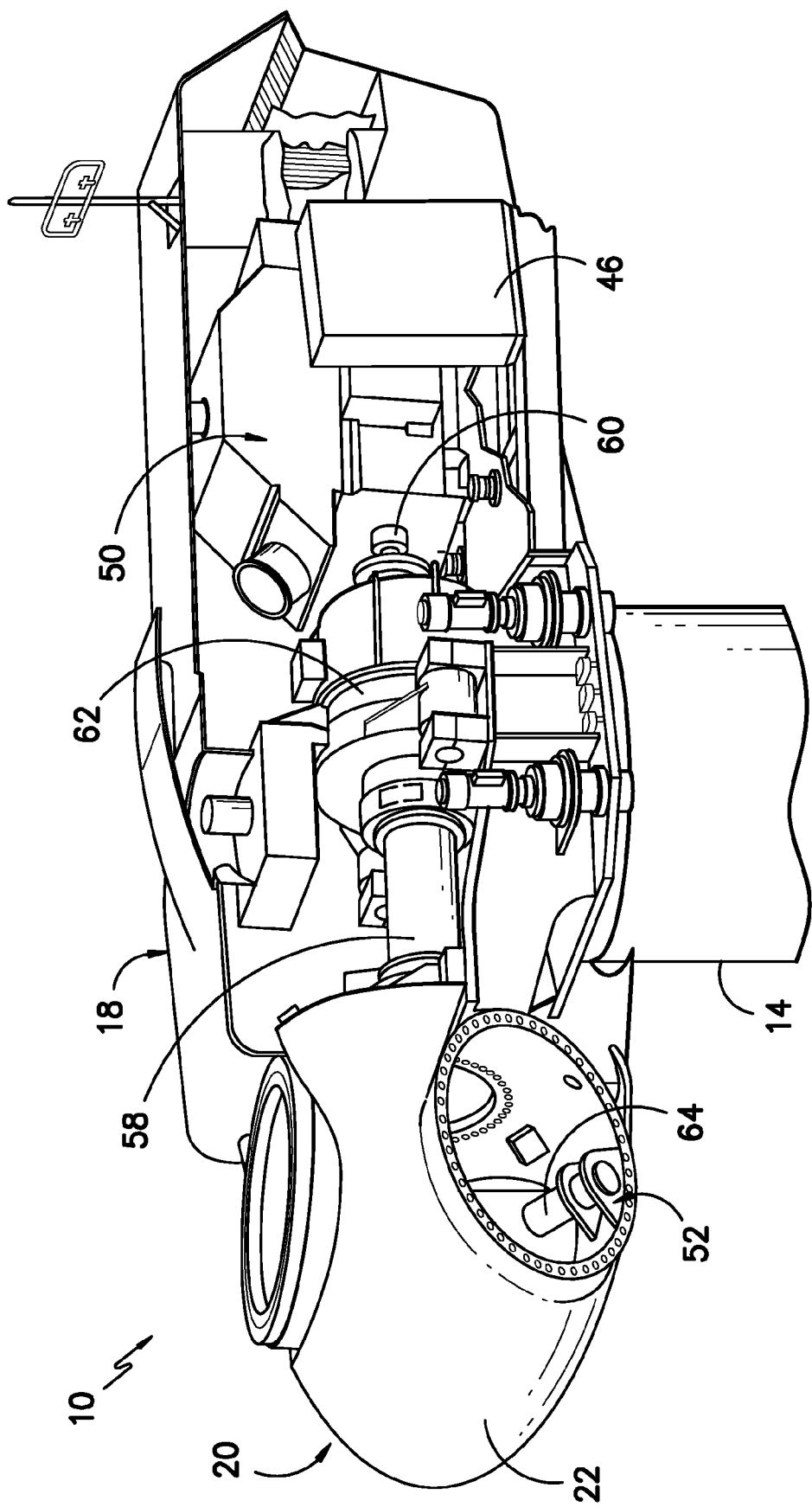
FIG. -3-

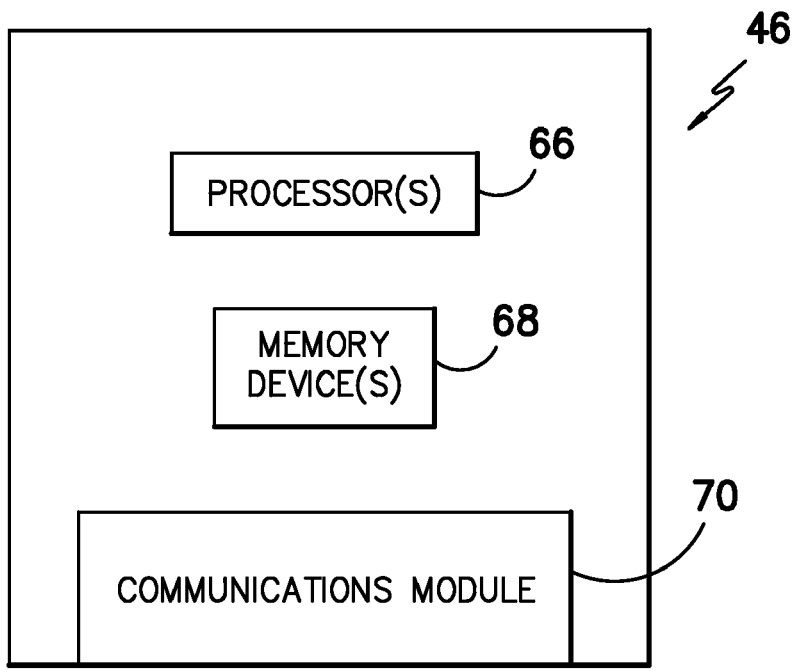
FIG. -4-
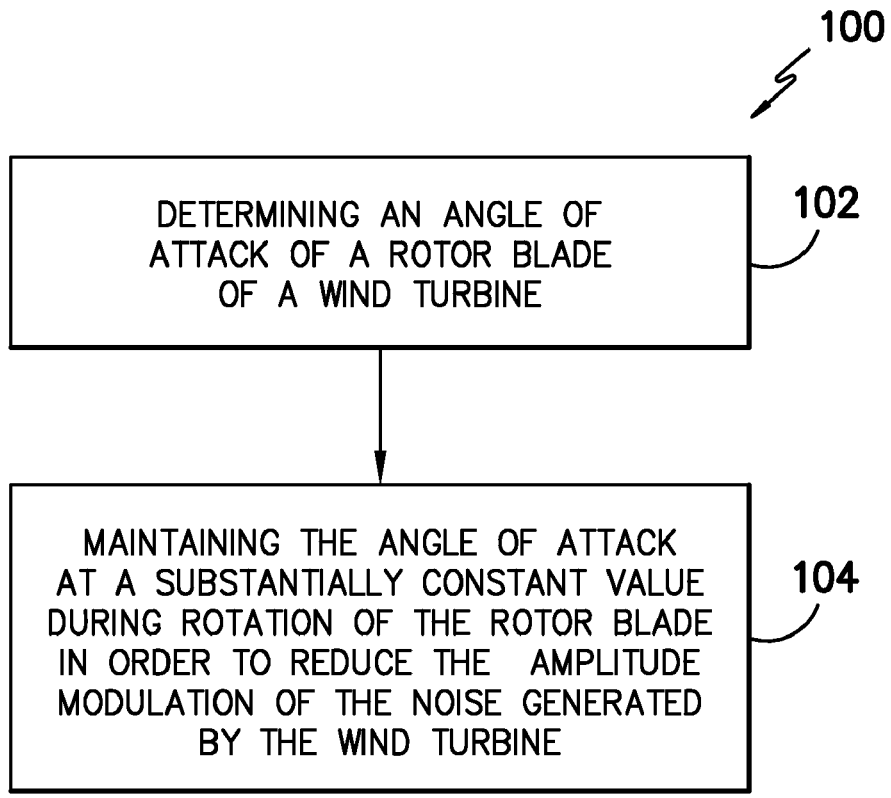
FIG. -5-

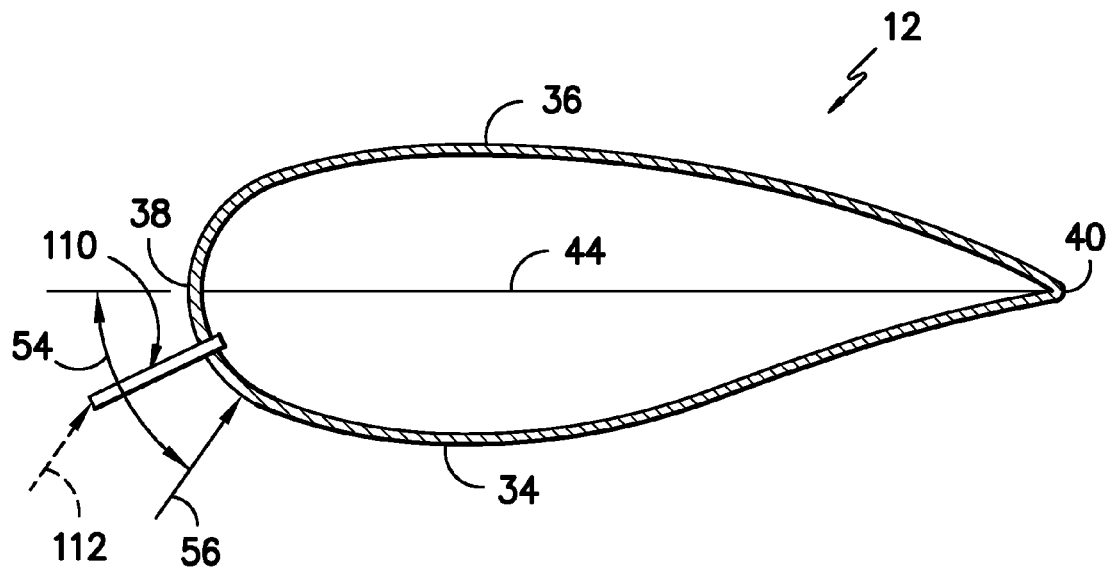
FIG. -6-
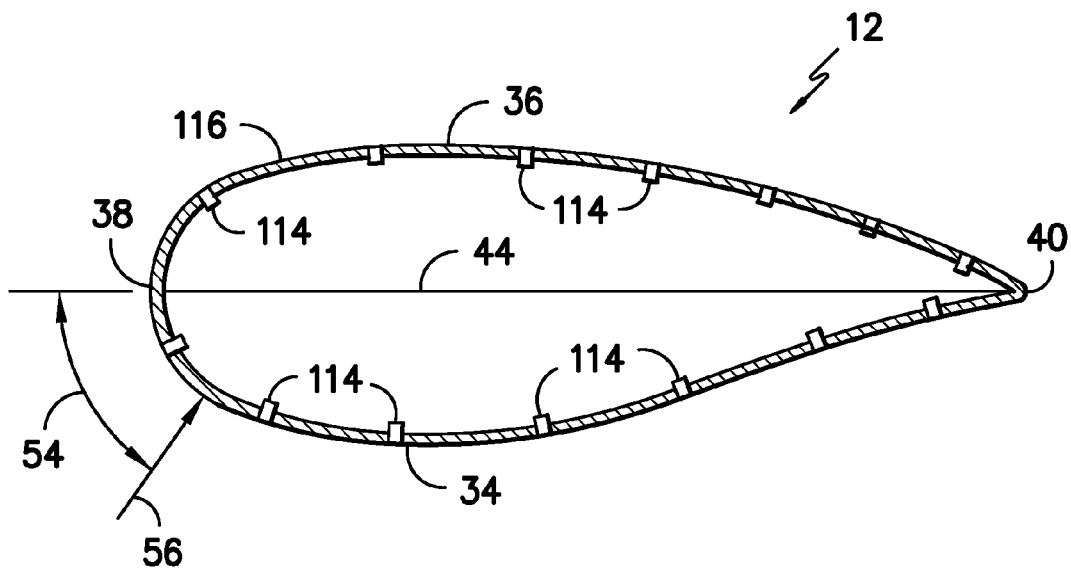
FIG. -7-

METHODS FOR CONTROLLING THE AMPLITUDE MODULATION OF NOISE GENERATED BY WIND TURBINES

FIELD OF THE INVENTION

The present subject matter relates generally to wind turbines and, more particularly, to a system and methods for controlling the amplitude modulation of noise generated by wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

During operation of a wind turbine, the rotation of the rotor blades through air generates aerodynamic noise. Due to the amplitude modulation (i.e., the peak-to-peak variation) of the aerodynamic noise, a "swooshing" or periodic pulsing sound is typically heard in the near field of the wind turbine (i.e., the area directly around the wind turbine). Such amplitude modulation is always present to some extent and, thus, is considered a normal and expected result of wind turbine operation. However, under certain conditions, an abnormal amplitude modulation effect can be heard in the far field (i.e., locations a certain distance (e.g., 1-4 kilometers) away from the wind turbines) that produces a "thumping" or "flapping" sound. This abnormal amplitude modulation has been described as having a more impulsive sound characteristic than that of the "swooshing" sound typically produced during operation of a wind turbine and, thus, is seen as a more of a nuisance to surrounding dwellings, residential communities and/or other populated areas. However, there is no system and/or method currently available that addresses this abnormal amplitude modulation effect.

Accordingly, a system and method for controlling the abnormal amplitude modulation of noise generated by a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for controlling the amplitude modulation of noise generated by a wind turbine. The method may generally include determining an angle of attack of a rotor blade of a wind turbine and maintaining the angle of attack at a substantially constant value during rotation of the rotor blade in order to reduce the amplitude modulation of the noise generated by the wind turbine.

In another aspect, the present subject matter discloses a method for controlling the amplitude modulation of noise generated by a wind turbine. The method may generally include determining an angle of attack of a plurality of rotor blades of a wind turbine and maintaining the angle of attack of each rotor blade at a substantially constant value during rotation of the plurality of rotor blades in order to reduce the amplitude modulation of the noise generated by the wind turbine.

In a further aspect, the present subject matter discloses a system for controlling the amplitude modulation of noise generated by a wind turbine. The system may generally include a pitch adjustment mechanism configured to adjust an angle of attack of a rotor blade of the wind turbine and a controller communicatively coupled to the pitch adjustment mechanism. The controller may be configured to control the pitch adjustment mechanism so that the angle of attack is maintained at a substantially constant value during rotation of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a cross-sectional view of one embodiment of a rotor blade of the wind turbine shown in FIG. 1 taken along line 2-2;

FIG. 3 illustrates a simplified, internal view of one embodiment of a nacelle of a wind turbine;

FIG. 4 illustrates a schematic diagram of one embodiment of suitable components that may be included within a turbine controller of a wind turbine;

FIG. 5 illustrates a flow diagram of one embodiment of a method for controlling the amplitude modulation of noise generated by a wind turbine;

FIG. 6 illustrates one embodiment of a sensor arrangement that may be utilized to determine the angle of attack of a wind turbine rotor blade; and FIG. 7 illustrates another embodiment of a sensor arrangement that may be utilized to determine the angle of attack of a wind turbine rotor blade.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is generally directed to a system and methods for controlling the abnormal amplitude modulation of noise generated by a wind turbine. In particular, the present subject matter is directed to a system and methods for controlling a rotor blade in a manner that reduces variation in the rotor blade's inflow angle of attack during rotation of the blade. For example, in several embodiments, the angle of attack of a rotor blade may be continuously monitored and compared to a baseline angle of attack. In the event that the actual angle of attack varies from the baseline angle of attack by a predetermined tolerance, the rotor blade may be pitched in order to maintain the angle of attack at a substantially constant value during rotation of the blade, thereby reducing and/or preventing abnormal amplitude modulation of the noise generated by a wind turbine.

Without wishing to be bound by theory, it is believed that abnormal amplitude modulation occurs as a result of one or more specific operating conditions of a wind turbine. Specifically, it is believed that abnormal amplitude modulation may occur as a result of a high wind shear condition at or adjacent to the wind turbine. For example, the unique "thumping" or "flapping" sound accompanying abnormal amplitude modulation appears to be heard most often at night when the atmosphere is relatively stable and an increased wind velocity gradient exists near the ground. This wind velocity gradient creates a significant variation between the inflow velocity at the top rotational position of each rotor blade (i.e., at the twelve o'clock position) and the inflow velocity at the bottom rotational position of each blade (i.e., at the six o'clock position). Such a variation of the inflow velocity is believed to augment the periodic and peak-to-peak noise signature typically generated by a rotor blade as it rotates, thereby causing abnormal amplitude modulation. Moreover, in extreme cases, it is believed that the variation in the inflow velocities may even cause a rotor blade to experience periodic stall and/or separation, resulting in a shift of the noise signature to lower frequencies that can propagate further into the far field. It is also believed that, in addition to wind shear from normal atmospheric conditions, angle of attack variations may also be caused by upflows due to the terrain at or adjacent to a wind turbine and/or by yaw misalignments of a wind turbine. Accordingly, by actively pitching the rotor blade in order to maintain the angle of attack at a substantially constant value despite varied operating conditions, the inventors of the present subject believe that abnormal amplitude modulation may be reduced and/or prevented.

Referring now to the drawings, FIGS. 1 and 2 illustrate embodiments of a wind turbine 10 and a rotor blade 12, respectively. In particular, FIG. 1 illustrates a perspective view of one embodiment of a wind turbine 10 and FIG. 2 illustrates a cross-sectional view of one embodiment of a rotor blade 12 of the wind turbine 10 shown in FIG. 1 taken along line 2-2.

As shown, the wind turbine 10 generally includes a tower 14 extending from a support surface 16, a nacelle 18 mounted on the tower 14, and a rotor 20 coupled to the nacelle 18. The rotor 20 includes a rotatable hub 22 and at least one rotor blade 12 coupled to and extending outwardly from the hub 22. For example, in the illustrated embodiment, the rotor 20 includes three rotor blades 12. However, in an alternative embodiment, the rotor 20 may include more or less than three rotor blades 12. Each rotor blade 12 may be spaced about the hub 22 to facilitate rotating the rotor 20 to enable kinetic energy to be transferred from the wind into usable mechanical energy, and subsequently, electrical energy. For instance, the hub 22 of the wind turbine 10 may be rotatably coupled to an electric generator 50 (FIG. 3) positioned within the nacelle 18 to permit electrical energy to be produced.

Each rotor blade 12 may generally include a blade root 24 configured to be mounted to the hub 22 and a blade tip 26 disposed opposite the blade root 24. The blade tip 26 may generally comprise the outermost point of each rotor blade 12 and, thus, may circumscribe the circular rotational path 28 defined by each blade 12 as it rotates about the center of the hub 22. For example, as shown in FIG. 2, a maximum height location 30 on the circular rotational path 28 may be defined by the blade tip 26 as each rotor blade 12 passes through its top rotational position (i.e., the twelve o'clock position) and a minimum height location 32 may be defined by the blade tip 26 as each rotor blade 12 passes through its bottom rotational position (i.e., the six o'clock position).

In addition, each rotor blade 12 may generally define an aerodynamic profile. For instance, as shown in FIG. 2, each blade 12 may include a pressure side 34 and a suction side 36 extending between a leading edge 38 and a trailing edge 40. Moreover, each rotor blade 12 may include a span 42 defining the total length between the blade root 24 and the blade tip 22 and a chord (indicated by chord line 44 in FIG. 2) defining the total length between the leading edge 38 and the trailing edge 40. As is generally understood, the chord 44 may generally vary in length with respect to the span 42 as the rotor blade 12 extends from the blade root 24 to the blade tip 26.

Further, as particularly shown in FIG. 1, the wind turbine 10 may also include a turbine control system or turbine controller 46 centralized within the nacelle 18. In general, the turbine controller 46 may comprise a computer or other suitable processing unit. Thus, in several embodiments, the turbine controller 46 may include suitable computer-readable instructions that, when implemented, configure the controller 46 to perform various different functions, such as receiving, transmitting and/or executing wind turbine control signals. As such, the turbine controller 46 may generally be configured to control the various operating modes (e.g., start-up or shut-down sequences) and/or components of the wind turbine 10. For example, the controller 46 may be configured to adjust the blade pitch or pitch angle of each rotor blade 12 (i.e., an angle that determines a perspective of the blade 12 with respect to the direction of the wind) about its pitch axis 48 in order to control the rotational speed of the rotor blade 12 and/or the power output generated by the wind turbine 10. For instance, the turbine controller 28 may control the pitch angle of the rotor blades 12, either individually or simultaneously, by transmitting suitable control signals to one or more pitch drives or pitch adjustment mechanisms 52 (FIG. 2) of the wind turbine 10. Accordingly, by pitching each rotor blade 12 about its pitch axis 48, an orientation or angle of attack 54 of the blade 12 relative to the wind may be adjusted.

It should be appreciated that, as used herein, the term "angle of attack" generally refers to the angle of a rotor blade 12 relative to the direction of the wind. Thus, as shown in FIG. 2, the angle of attack 54 of a rotor blade 12 may correspond to an angle defined between the chord line 44 and an inflow wind vector 56 representing the relative motion between the blade 12 and the surrounding air. As is generally understood, decreasing the angle of attack 54 by pitching a rotor blade 12 to a "feathered position" entails rotating the leading edge 38 of the blade 12 into the wind. Similarly, increasing the angle of attack 54 by pitching a rotor blade 12 to a more power/stalled position entails rotating the leading edge 38 of the blade 12 out of the wind.

Referring now to FIG. 3, a simplified, internal view of one embodiment of the nacelle 18 of the wind turbine 10 shown in FIG. 1 is illustrated. As shown, a generator 50 may be disposed within the nacelle 18. In general, the generator 50 may be coupled to the rotor 20 for producing electrical power from the rotational energy generated by the rotor 20. For example, as shown in the illustrated embodiment, the rotor 20 may include a rotor shaft 58 coupled to the hub 22 for rotation therewith. The rotor shaft 58 may, in turn, be rotatably coupled to a generator shaft 60 of the generator 50 through a gearbox 62. As is generally understood, the rotor shaft 58 may provide a low speed, high torque input to the gearbox 62 in response to rotation of the rotor blades 12 and the hub 22. The gearbox 62 may then be configured to convert the low speed, high torque input to a high speed, low torque output to drive the generator shaft 58 and, thus, the generator 50.

Additionally, the turbine controller 46 may also be located within the nacelle 18. As is generally understood, the turbine controller 46 may be communicatively coupled to any number of the components of the wind turbine 10 in order to control the operation of such components. For example, as indicated above, the turbine controller 46 may be communicatively coupled to each pitch adjustment mechanism 52 of the wind turbine 10 (one of which is shown) to permit the pitch angle of each rotor blade 12 to be adjusted about its pitch axis 48. In general, each pitch adjustment mechanism 52 may include any suitable components and may have any suitable configuration that allows the pitch adjustment mechanism 52 to facilitate rotation of a rotor blade 12 about its pitch axis 48. For example, in one embodiment, each pitch adjustment mechanism 52 may include at least one pitch drive motor 64 (e.g., an electric motor) for rotating a rotor blade 12 about its pitch axis 48. Alternatively, each pitch adjustment mechanism 52 may include any other suitable means for facilitating rotational motion of a rotor blade 12 such as, but not limited to, hydraulic cylinders, springs and/or servomechanisms.

Additionally, each pitch adjustment mechanism 52 may also include various other components coupled to and/or functioning together with the drive motor 52 and/or any other means used for facilitating rotational motion of a rotor blade 12. For example, in one embodiment, the pitch drive motor 64 may be coupled to a pitch drive gearbox (not shown) such that the pitch drive motor 64 imparts mechanical force to the pitch drive gearbox. Similarly, the pitch drive gearbox may be coupled to a pitch drive pinion (not shown) which may, in turn, be coupled to a pitch bearing (not shown) of the rotor blade 12. Thus, in one embodiment, rotation of the pitch drive motor 64 rotates the pitch drive gearbox and the pitch drive pinion, thereby rotating the pitch bearing and the rotor blade 12 about the pitch axis 48.

Moreover, it should be appreciated that the wind turbine 10 may also include a plurality of sensors (not shown) for detecting and/or measuring one or more operating parameters and/or operating conditions of the wind turbine 10. For example, the wind turbine 10 may include sensors for detecting and/or measuring the pitch angle of each rotor blade 12, the speed of the rotor 20 and/or the rotor shaft 58, the speed of the generator 50 and/or the generator shaft 60, the torque on the rotor shaft 58 and/or the generator shaft 60, the wind speed and/or wind direction and/or any other operational parameters/conditions of the wind turbine 10.

Referring now to FIG. 4, there is illustrated a block diagram of one embodiment of suitable components that may be included within the turbine controller 46 in accordance with aspects of the present subject matter. As shown, the turbine controller 46 may include one or more processor(s) 66 and associated memory device(s) 68 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 68 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 68 may generally be configured to store suitable computer-readable instructions that, when implemented by the processor(s) 66, configure the turbine controller 46 to perform various functions including, but not limited to, determining the angle of attack 54 (FIG. 2) of one or more of the rotor blades 12, controlling the angle of attack 54 of one or more of the rotor blades 12 by transmitting suitable control signals to one ore more pitch adjustment mechanisms 52 and various other suitable computer-implemented functions.

Additionally, the turbine controller 46 may also include a communications module 70 to facilitate communications between the controller 46 and the various components of the wind turbine 10. For instance, the communications module 70 may serve as an interface to permit the turbine controller 46 to transmit control signals to each pitch adjustment mechanism 52 for controlling the angle of attack 54 of the rotor blades 12. Moreover, the communications module 70 may include a sensor interface (e.g., one or more analog-to-digital converters) to permit any signals transmitted from the sensor(s) of the wind turbine 10 to be converted into signals that can be understood and processed by the processors 66.

Referring now to FIG. 5, there is illustrated a flow diagram of one embodiment of a method 100 for controlling the abnormal amplitude modulation of noise generated by a wind turbine 10. As shown, the method generally includes determining an angle of attack of a rotor blade of a wind turbine 102 and maintaining the angle of attack at a substantially constant value during rotation of the rotor blade in order to reduce the amplitude modulation of the noise generated by the wind turbine 104.

As indicated above, the disclosed method 100 may generally provide a means for reducing and/or preventing abnormal amplitude modulation of the noise generated by a wind turbine 10. Specifically, during times of high wind shear, the wind velocity gradient may cause the angle of attack 54 of a rotor blade 12 to vary significantly as the blade 12 rotates from its top rotational position to its bottom rotational position, thereby generating an abnormal amplitude modulation effect as the typical noise signature of the blade 12 is altered. Accordingly, by controlling a rotor blade 12 so as to maintain a substantially constant angle of attack 54 as the blade 12 rotates, the abnormal amplitude modulation effect may be reduced and/or prevented.

As shown in FIG. 5, in 102, the angle of attack 54 (FIG. 2) of a rotor blade 12 is determined. In general, the angle of attack 54 may be determined using any suitable means and/or method known in the art. In several embodiments, one or more sensors may be mounted to and/or embedded within a portion of the rotor blade 12 to allow the angle of attack 54 to be continuously monitored. Specifically, the sensor(s) may be configured to measure, detect and/or sense one or more operating conditions of the rotor blade 12 and transmit signals associated with such operating conditions to the turbine controller 46 for subsequent processing/analysis. The turbine controller 46 may be provided with suitable computer-readable instructions that, when implemented, configure the controller 46 to correlate the measurement signals transmitted from the sensor(s) to the angle of attack 54 of the rotor blade 12.

For instance, one example of a suitable sensor arrangement is illustrated in FIG. 6. As shown, the rotor blade 12 may include a sensor probe 110 mounted to and/or embedded within a portion of the blade 12. Specifically, in the illustrated embodiment, the sensor probe 110 is mounted to the rotor blade 12 so that it extends from the blade 12 at a location offset from the chord line 44. The sensor probe 110 may generally include a plurality of sensors (not shown) for detecting one or more wind parameters (e.g., wind velocity, wind direction, wind pressure and the like) at a location at and/or adjacent to the surface of the rotor blade 12. For example, in one embodiment, the sensor probe 110 may be configured as a five hole probe having pressure sensors installed therein for detecting wind pressure at five different locations and/or orientations on the probe. However, in other embodiments, the sensor probe 110 may have any other suitable configuration and may include any other suitable type of sensors that permits the sensor probe 110 to function as described herein.

The wind parameter measurements taken by the sensor probe 110 may then be transmitted to the turbine controller 46 (e.g., via a wired or wireless connection) for subsequent processing and/or analysis. For example, the turbine controller 46 may be provided with suitable computer-readable instructions that configure the controller 46 to determine a measured inflow wind vector 112 at the point of measurement on the sensor probe 110. It should be appreciated that, in one embodiment, it may be assumed that the measured inflow wind vector 112 is equal to the inflow wind vector 56 at the surface of the rotor blade 12 and, thus, may be used directly to determine angle of attack 54. Alternatively, a suitable transfer function may be developed relating the measured inflow wind vector 112 to the inflow wind vector 56 at the blade surface in order to take into account any factors that may affect the inflow of the wind (e.g., active induction occurring at or near the blade surface).

Another example of a suitable sensor arrangement for determining the angle of attack 54 of a rotor blade 12 is illustrated in FIG. 7. As shown, the rotor blade 12 may include a plurality of sensors 114 mounted to or embedded within an outer surface 116 of the rotor blade 12. In several embodiments, the sensors 114 may include a plurality of pressure sensors configured to detect surface pressure at various locations around the circumference of the rotor blade 12. For instance, the pressure sensors may be disposed around the circumference of the rotor blade 12 at various different radial locations to permit surface pressure measurements to be taken at several locations along the span 42 of the blade 12. The surface pressure measurements may then be transmitted to the turbine controller 46 (e.g., via a wired or wireless connection) for subsequent processing and/or analysis. For example, the turbine controller 46 may be provided with suitable computer-readable instructions that configure the controller 46 to determine angle of attack 54 by analyzing the surface pressure distribution over the pressure and suction sides 34, 36 of the rotor blade 12. Specifically, as is generally understood by those of ordinary skill in the art, by determining the surface pressure distribution over the rotor blade 12, the angle of attack 54 may be determined by comparing the measured surface pressure distribution to a baseline or calibration pressure distribution for which the angle of attack 54 is already known. Of course, it should be appreciated that the sensors 114 need not comprise pressure sensors but may generally comprise any other suitable sensors known in the art that permit the angle of attack 54 of a rotor blade 12 to be determined based on the measurement signals transmitted from such sensors.

It should also be appreciated that, in alternative embodiments, angle of attack 54 may be determined using any other suitable means and/or method known in the art. For instance, in another embodiment of the present subject matter, angle of attack 54 may be determined using a model-based approach. Specifically, angle of attack 54 may be modeled using various other operating parameters of the wind turbine 10. For example, in a particular embodiment, angle of attack 54 may be modeled using the operating parameters typically monitored during operation of a wind turbine 10 such as, but not limited to, wind speed, wind pressure, wind direction, pitch angle of the blade 12 and the like. In addition, angle of attack 54 may be modeled using wind shear measurements. For instance, a Light Detection and Ranging (LIDAR) system or other suitable device may be installed on or adjacent to a wind turbine 10 and may be utilized to measure wind shear directly. The wind shear measurements may then be input into a suitable model to determine the corresponding variations in the angle of attack 54 occurring due to the wind shear. The development of a suitable model relating such operating parameters to angle of attack 54 is well within the capability of those skilled in the art, and therefore will not be discussed in any detail herein.

Additionally, it should be appreciated that, although the above description generally discusses the determination of the angle of attack 54 for a single rotor blade 12, the turbine controller 46 may generally be configured to determine the angle of attack 54 for any and/or all of the rotor blades 12 of a wind turbine 10. For instance, in one embodiment, it may be assumed that the angle of attack 54 at each rotor position is the same for each rotor blade 12 and, thus, angle of attack 54 for each rotor blade 12 may be determined by monitoring a single blade 12. Alternatively, the controller 46 may be configured to monitor the angle of attack 54 of each rotor blade 12 individually. For example, one or more sensor probes 110 and/or sensors 114 may be mounted to and/or embedded within a portion of each rotor blade 12 to permit the controller 54 to individually assess the angle of attack 54 of each rotor blade 12.

Referring back to FIG. 5, in 104 of the disclosed method 100, the rotor blade 12 is controlled in order to maintain the angle of attack 54 at a substantially constant value, thereby reducing the amplitude modulation of the noise generated by the wind turbine 10. As used herein, the term "substantially constant value" refers to a range of angular values within which it is believed that the angle of attack 54 may vary without causing a significant abnormal amplitude modulation effect. For instance, in several embodiments, angle of attack 54 may be maintained at a substantially constant value when the total variation in the angle of attack 54 during a full revolution of a rotor blade 12 is less than about 10 degrees, such as less than about 5 degrees, or less than about 3 degrees or less than about 2 degrees, or less than about 1 degree, or less than about 0.5 degrees and all other subranges therebetween.

It should be appreciated by those of ordinary skill in the art that the angle of attack 54 of a rotor blade 12 may vary during each revolution by differing magnitudes along the entire span 42 of the blade. For example, due to rotational effects, the variation in the angle of attack 54 at inboard locations on the rotor blade 12 may be significantly higher than the variations in angle of attack 54 at more outboard locations. Thus, in several embodiments, it may be desirable to control the rotor blade 12 such that angle of attack 54 is maintained at a substantially constant value only at specific outboard locations along the span 42 of the blade 12. For instance, in one embodiment, angle of attack 54 may be maintained at a substantially constant value only at radial locations on the rotor blade 12 greater than about 75% of the blade's span 42, such as greater than about 80% of the blade's span 42 or greater than about 85% of the blade's span 42 or greater than about 90% of the blade's span 42 and all other subranges therebetween. However, in alternative embodiments, the angle of attack 54 may be maintained at a substantially constant value at radial locations on the rotor blade 12 less than about 75% of the blade's span 42.

Additionally, it should be appreciated that, in several embodiments, the angle of attack 54 of each rotor blade 12 may be maintained at a substantially constant value by actively pitching each blade 12 in response to variations in the angle of attack 54. For instance, in a particular embodiment of the present subject matter, the angle of attack 54 of each rotor blade 12 may be compared to a baseline angle of attack and, in the event that the angle of attack 54 falls outside a predetermined tolerance for the baseline angle of attack, the rotor blade 12 may be appropriately pitched in order to bring the angle of attack 54 within the predetermined tolerance.

In such an embodiment, the baseline angle of attack may generally correspond to a predetermined orientation of the rotor blade 12 relative to the wind at which it is believed that blade performance may be optimized without significantly affecting the amplitude modulation of the noise generated by the wind turbine 10. Thus, it should be appreciated that the baseline angle of attack may vary from wind turbine 10 to wind turbine 10 and from rotor blade 12 to rotor blade 12 based on various factors including, but not limited to, the configuration of the rotor blade 12 (e.g., size and shape of the rotor blade 12), the anticipated and/or measured operating conditions of the wind turbine 10 (e.g., wind speed, wind direction, magnitude of wind gradient) and the like. However, in several embodiments, the baseline angle of attack may be equal to an angle of less than about 10 degrees, such as an angle ranging from about 1 degree to about 8 degrees or from about 1 degree to about 6 degrees or from about 2 degrees to about 5 degrees and all other subranges therebetween.

Moreover, it should be appreciated that the baseline angle of attack chosen for a particular rotor blade 12 may be varied based on changing wind conditions and/or variations in other operating conditions. As such, in one embodiment, the turbine controller 46 may be configured to continuously update the baseline angle of attack to adjust for changing operating conditions. Alternatively, the baseline angle of attack may be preprogrammed within the turbine controller 46 and may be maintained at a predetermined value regardless of changing operating conditions.

Similarly, the predetermined tolerance may generally correspond to an angular tolerance for the baseline angle of attack within which the angle of attack 54 of a rotor blade 12 may vary without a significant increase in the amplitude modulation of the noise generated by the wind turbine 10. Thus, in several embodiments, the predetermined tolerance may correspond to a total allowable variation in the baseline angle of attack 54 equal to the range of angular values utilized to define when angle of attack 54 is maintained at a substantially constant value. For instance, in accordance with the embodiments described above with respect to a "substantially constant value", the predetermined tolerance may be equal to less than about 10 degrees of total variation from the baseline angle of attack, such as less than about 5 degrees of total variation, or less than about 3 degrees of total variation, or less than about 2 degrees of total variation, or less than about 1 degree of total variation, or less than about 0.5 degrees of total variation and all other subranges therebetween.

It should be appreciated that the angle of attack 54 may vary from the value chosen for the baseline angle of attack in a positive direction (i.e., an increase in angle of attack 54 over the baseline angle of attack) and/or in a negative direction (i.e., a decrease in angle of attack 54 from the baseline angle of attack). Thus, any portion of the total variation allowed by the predetermined tolerance may be added to and/or subtracted from the baseline angle of attack to define an allowable range of values for the angle of attack 54. For instance, depending on the wind conditions, the predetermined tolerance may be added to the baseline angle of attack to define an allowable range of values or subtracted from the baseline angle of attack to define an allowable range of values. Alternatively, a percentage of the predetermined tolerance may be added to the baseline angle of attack, with the remaining percentage being subtracted from the baseline angle of attack to define an allowable range of values.

It should also be appreciated that angle of attack 54 may be maintained at a substantially constant value by adjusting the rotor speed of the wind turbine 10. Specifically, by increasing and/or decreasing rotor speed, the angle of attack 54 may be altered. Thus, in addition to pitching a rotor blade 12 or as an alternative thereto, the rotor speed may be controlled in order to maintain the angle of attack 54 within the predetermined tolerance defined for the baseline angle of attack. The rotor speed of a wind turbine 10 may generally be adjusted using any suitable means and/or method known in the art. For instance, in several embodiments, rotor speed may be adjusted by altering the torque demand on the generator 50 or by yawing the nacelle 18 relative to the wind. Additionally, as is generally understood, rotor speed may also be adjusted by pitching the blades 12.

Further, it should be appreciated that, as indicated above, the present subject matter is also directed to a system for controlling the amplitude modulation of noise generated by a wind turbine 10. For example, in several embodiments, the disclosed system may include a pitch adjustment mechanism 52 configured to adjust the angle of attack 54 of a rotor blade 12 and a controller 46 communicatively coupled to the pitch adjustment mechanism 52 (e.g., via a wired or wireless connection). The controller 46 may generally be configured to control the pitch adjustment mechanism 52 so that the angle of attack 54 is maintained at a substantially constant value during rotation of the rotor blade 12. Specifically, as described above, the controller 46 may be configured to determine the angle of attack 54 of a rotor blade 12 using any suitable means and/or method known art. For example, the controller 46 may be communicatively coupled to one or more sensor probes 110 and/or sensors 114 so that parameter measurements related to angle of attack 54 may be transmitted from the sensor probe(s) 110 and/or sensor(s) 114 to the controller 46 to permit angle of attack 54 to be determined. Additionally, in one embodiment, to ensure that the angle of attack 54 is maintained at a substantially constant value, the controller 46 may be configured to compare the angle of attack 54 to a baseline angle of attack, such as by determining whether the angle of attack 54 falls within a predetermined tolerance for the baseline angle of attack. In the event that the angle of attack 54 falls outside the predetermined tolerance, the controller 46 may transmit suitable control signals to the pitch adjustment mechanism 42 in order to appropriately pitch the rotor blade 12 and, thus, maintain the angle of attack 54 at a substantially constant value during rotation of the blade 12.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling the amplitude modulation of noise generated by a wind turbine, the method comprising:
    determining an angle of attack of a rotor blade of a wind turbine; and,
    maintaining the angle of attack at a substantially constant value only at radial locations on the rotor blade greater than about 75% of a span of the rotor blade during rotation of the rotor blade in order to reduce the amplitude modulation of the noise generated by the wind turbine.

2. The method of claim 1, wherein maintaining the angle of attack at a substantially constant value comprises comparing the angle of attack to a baseline angle of attack.

3. The method of claim 2, wherein the baseline angle of attack is equal to less than about 10 degrees.

4. The method of claim 2, wherein the baseline angle of attack ranges from about 1 degree to about 6 degrees.

5. The method of claim 2, wherein maintaining the angle of attack at a substantially constant value comprises pitching the rotor blade when the angle of attack falls outside a predetermined tolerance for the baseline angle of attack.

6. The method of claim 5, wherein the predetermined tolerance is equal to a total variation of the baseline angle of attack of less than about 10 degrees.

7. The method of claim 1, wherein maintaining the angle of attack at a substantially constant value comprises pitching the rotor blade using a pitch adjustment mechanism of the wind turbine.

8. The method of claim 1, wherein determining an angle of attack of a rotor blade of the wind turbine comprises receiving with a controller of the wind turbine a signal related to the angle of attack from at least one sensor mounted to or embedded within the rotor blade.

9. The method of claim 1, wherein maintaining the angle of attack at a substantially constant value during rotation of the rotor blade in order to reduce the amplitude modulation of the noise generated by the wind turbine comprises adjusting a rotor speed of the wind turbine.

10. A method for controlling the amplitude modulation of noise generated by a wind turbine, the method comprising:
    determining an angle of attack of a plurality of rotor blades of a wind turbine; and,
    maintaining the angle of attack of each rotor blade at a substantially constant value only at radial locations on each rotor blade greater than about 75% of a span of the rotor blade during rotation of the plurality of rotor blades in order to reduce the amplitude modulation of the noise generated by the wind turbine.

11. A system for controlling the amplitude modulation of noise generated by a wind turbine, the system comprising:
    a pitch adjustment mechanism configured to adjust an angle of attack of a rotor blade of the wind turbine; and
    a controller communicatively coupled to the pitch adjustment mechanism, the controller being configured to control the pitch adjustment mechanism so that the angle of attack is maintained at a substantially constant value only at radial locations on the rotor blade greater than about 75% of a span of the rotor blade during rotation of the rotor blade.

12. The system of claim 11, wherein the controller is configured to control the pitch adjustment mechanism so that the angle of attack is maintained within a predetermined tolerance of a baseline angle of attack defined for the rotor blade.

13. The system of claim 12, wherein the baseline angle of attack equal to less than about 10 degrees.

14. The system of claim 12, wherein the baseline angle of attack ranges from about 1 degree to about 6 degrees.

15. The system of claim 12, wherein the predetermined tolerance is equal to a total variation of the baseline angle of attack of less than about 10 degrees.

16. The system of claim 12, wherein the predetermined tolerance is equal to a total variation of the baseline angle of attack of less than about 3 degrees.

17. The system of claim 11, further comprising at least one sensor communicatively coupled to the controller, the at least one sensor being configured to measure the angle of attack of the rotor blade.

18. The system of claim 17, wherein the at least one sensor comprises at least one sensor probe mounted to or embedded within the rotor blade.

19. The system of claim 17, wherein the at least one sensor comprises a plurality of pressure sensors mounted to or embedded within the rotor blade.

* * * * *